United States Patent
Bogenschuetz

(10) Patent No.: US 9,834,042 B2
(45) Date of Patent: Dec. 5, 2017

(54) METHOD FOR DETERMINING THE TREAD DEPTH OF A VEHICLE PNEUMATIC TIRE

(71) Applicant: Continental Reifen Deutschland GmbH, Hannover (DE)

(72) Inventor: Peter Bogenschuetz, Wedemark (DE)

(73) Assignee: Continental Reifen Deutschland GmbH, Hannover (DE)

( * ) Notice: Subject to any disclaimer, the term of this patent is extended or adjusted under 35 U.S.C. 154(b) by 363 days.

(21) Appl. No.: 14/519,019

(22) Filed: Oct. 20, 2014

(65) Prior Publication Data

US 2015/0035971 A1 Feb. 5, 2015

Related U.S. Application Data

(63) Continuation of application No. PCT/EP2013/055115, filed on Mar. 13, 2013.

(30) Foreign Application Priority Data

Apr. 19, 2012 (DE) .................. 10 2012 103 420

(51) Int. Cl.
*B60C 11/12* (2006.01)
*B60C 11/24* (2006.01)
(Continued)

(52) U.S. Cl.
CPC ............ *B60C 11/24* (2013.01); *B60C 11/246* (2013.01); *G01B 11/22* (2013.01); *G06T 7/0008* (2013.01);
(Continued)

(58) Field of Classification Search
CPC ....... B60C 11/12; B60C 11/24; B60C 19/002; H04Q 5/22; G06K 19/0672
See application file for complete search history.

(56) References Cited

U.S. PATENT DOCUMENTS 2,102,784 A 12/1937 Bridges
4,226,274 A 10/1980 Awaya et al.
(Continued)

FOREIGN PATENT DOCUMENTS

DE 36 27 833 A1 2/1988
JP 2009107484 A 5/2009

OTHER PUBLICATIONS

International Search Report dated Jun. 3, 2013 of international application PCT/EP2013/055115 on which this application is based.

*Primary Examiner* — Sath V Perungavoor
*Assistant Examiner* — Patricia I Young
(74) *Attorney, Agent, or Firm* — Walter Ottesen, P.A.

(57) ABSTRACT

A method for determining the profile depth of a tread of a pneumatic vehicle tire wherein the tread has a wear indicator. The wear indicator has an incision extending in the radial direction of the tire. The incision has a length visible on the tread and the length becomes shorter as wear increases. The wear indicator has two reference marks at a distance from each other. The distance is configured to remain constant and visible throughout the tread wear. A photo of the incision and the reference marks is generated via an application program of a mobile phone having a camera and an image screen. A current profile depth is calculated from the distance of the reference marks and the length of the incision via the application program. The current profile depth and/or a remaining profile depth are displayed until a minimal profile depth is reached on the screen.

20 Claims, 4 Drawing Sheets

(51) Int. Cl.
*B29D 30/66* (2006.01)
*G01B 11/22* (2006.01)
*G06T 7/00* (2017.01)
*H04N 5/232* (2006.01)

(52) U.S. Cl.
CPC ............... *H04N 5/23293* (2013.01); *G06T 2207/10004* (2013.01); *G06T 2207/30252* (2013.01)

(56) References Cited

U.S. PATENT DOCUMENTS

| | | | |
|---|---|---|---|
| 6,523,586 B1* | 2/2003 | Eromaki | B60C 11/24 |
| | | | 152/154.2 |
| 6,883,567 B2 | 4/2005 | Shimura | |
| 2005/0110614 A1* | 5/2005 | Coates | G06K 19/0672 |
| | | | 340/10.41 |
| 2013/0243212 A1* | 9/2013 | Sugden | B60C 19/002 |
| | | | 381/71.1 |

\* cited by examiner

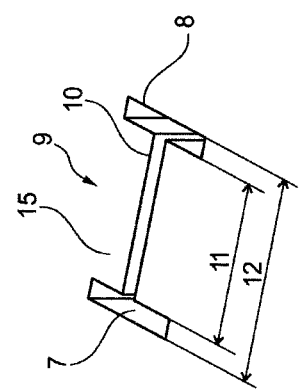
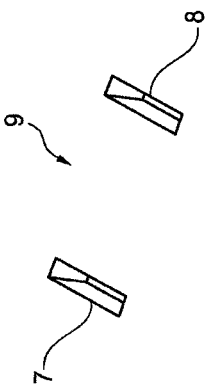
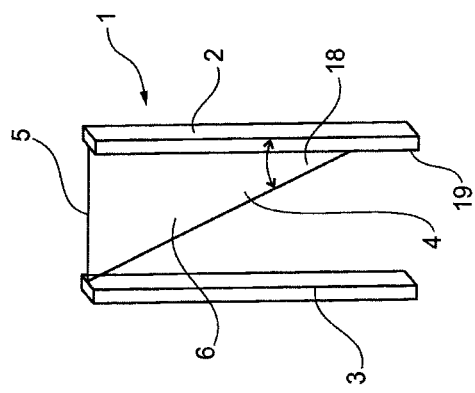
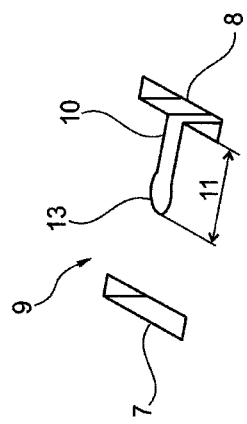

METHOD FOR DETERMINING THE TREAD DEPTH OF A VEHICLE PNEUMATIC TIRE

CROSS REFERENCE TO RELATED APPLICATIONS

This application is a continuation application of international patent application PCT/EP2013/055115, filed Mar. 13, 2013, designating the United States and claiming priority from German application 10 2012 103 420.6, filed Apr. 19, 2012, and the entire content of both applications is incorporated herein by reference.

FIELD OF THE INVENTION

The invention relates to a method for determining the profile depth of the tread of a pneumatic vehicle tire, wherein at least one wear indicator is provided in the tread. The wear indicator has at least one incision which runs in the radial direction. The length of the incision, which is visible on the outside of the tread, becomes shorter in a defined manner as wear increases. The wear indicator has at least two reference marks, the mutual distance between the two reference marks remaining constant and visible over the tread wear. The invention further relates to a mobile telephone, in particular a smartphone, having a camera and a screen, for determining the profile depth of a tread of a pneumatic vehicle tire, wherein at least one wear indicator is provided in the tread. The wear indicator has at least one incision which runs in the radial direction. The length of the incision, which is visible on the outside of the tread, becomes shorter in a defined manner as wear increases. The wear indicator has at least two reference marks and the mutual distance between the two reference marks remains constant and visible over the tread wear.

BACKGROUND OF THE INVENTION

Measuring and recording the current profile depth of tires is important primarily in fleet management in order to obtain an overview of the running performance and the wear behavior of the tires which are used on the individual vehicles. However, measuring and recording the profile depth is important for individuals too. In addition to the use of profile depth measuring devices, indicators which are integrated in the tread of the tires have also become well-established. The indicators allow the wear of the tread to be established with the aid of incisions of different depth in the tread. Conventional wear indicators in the tread of a tire are also designed as raised portions on the profile base of a circumferential groove. If this raised portion reaches the level of the surface of the tread, the legally prescribed minimum profile depth has been reached. However, the vehicle owner or vehicle user can only roughly estimate the current profile depth. Furthermore, there is a risk of cracks being produced in the circumferential grooves in the case of wear indicators of this kind.

U.S. Pat. No. 4,226,274 B discloses designing a wear indicator in the form of a narrow insert which is a different color to the surrounding rubber and runs over the tread circumference. This insert has a specific cross section, with the result that the insert becomes narrower as wear increases. U.S. Pat. No. 6,883,567 B discloses making incisions in the tread. The incisions either become shorter or longer as wear increases. A CCD camera is used to evaluate or determine the tread wear. The CCD camera creates images of the incisions and passes on the data to a processor which calculates the current profile depth by evaluating the dimensions of the incision and comparing them with the stored dimensions of the original incision. This apparatus requires a large amount of equipment and can be operated only in a stationary state.

SUMMARY OF THE INVENTION

It is an object of the invention to provide a method of the type cited above which allows the current profile depth to be established in a manner which is independent of location, time and weather, without a large amount of equipment being required and in a very convenient manner.

According to the invention, the above object is achieved in that a photograph of the incision and of the reference marks is created by means of an application program of a mobile telephone, in particular of a smartphone, which has a camera and a screen, wherein the application program uses the defined distance between the reference marks and the length of the incision to calculate the current profile depth and displays on the screen the current profile depth and/or the profile depth remaining until the minimum profile depth is reached.

The invention also relates to a mobile telephone for determining the profile depth of a tread, wherein, according to the invention, an application program is installed on the mobile telephone, the application program providing a positioning mask on the screen, the positioning mask having at least two markers which are intended to be brought into line with the reference marks of the wear indicator, by means of which application program a photograph of the incision with positioned markers is further created, and which application program uses the length of the photographed incision, the stored data relating to the incision characteristics, and the actual distance between the reference marks to calculate the current profile depth and displays the current profile depth and/or the profile depth remaining until the minimum profile depth is reached.

Therefore, according to the invention, application software which is stored in a mobile telephone, allows the current profile depth of a pneumatic vehicle tire to be established in a simple manner, independently of time, location and weather.

The application program shows on the screen of the mobile telephone a positioning mask which comprises at least two markers or has at least two markers which are brought into line with the reference marks on the tire before or after the photograph of the wear indicator is created. Since the mutual distance between the reference markers or the positioning of the reference markers is a variable which is stored in the application program, a reference value which allows the profile depth to be calculated from the incision length in the photo is provided to the application program by the positioning of the markers.

The markers should be clearly visible on the screen. Therefore, suitable markers are, for example, circles, dashes, + signs or other symbols.

There are many ways of providing the application program with clearly visible reference marks on the tread of the tire. According to a preferred embodiment of the invention, the reference marks are holes which are formed in the tread and which are located at a short distance from the ends of the incision/incisions. Reference marks which are short boundary incisions which are positioned at the ends of the incision/incisions in new tires are also clearly visible and can be easily marked. In the case of a design of the wear indicator with two incisions which are arranged in alignment with one another and of which the outer ends maintain their position as wear increases, the outer ends of these incisions can be used as reference marks.

The use of an application program according to the invention is particularly advantageous when the determined profile depth or a variable which is correlated to the profile depth can be transmitted by data transfer, for example by Internet or by means of a mobile radio network, to an external location, in particular to an external data memory or to a server. Further data, such as the date and time of the measurement, or vehicle- and/or tire-related data and the like can preferably be stored in the application program. Provision can advantageously be made for the data to also be transmitted to an external location, for example at the same time as the profile depth, in particular in a manner correspondingly selected by the user.

The positioning mask can furthermore display at least one measurement marking which is positioned at an incision end of the photographed incision. This positioning can be performed automatically or manually by the measurement marking being moved over the screen (touchscreen). The use of one or more measurement markings has the advantage that the length of the incision or of the incisions of the wear indicator can be exactly determined. The measurement marking can be designed as a dash, as an arrow or the like.

BRIEF DESCRIPTION OF THE DRAWINGS

The invention will now be described with reference to the drawings wherein:

FIG. 1 shows a sipe for forming a wear indicator;

FIGS. 2 to 4 show a wear indicator in different stages of wear;

Figure 6:
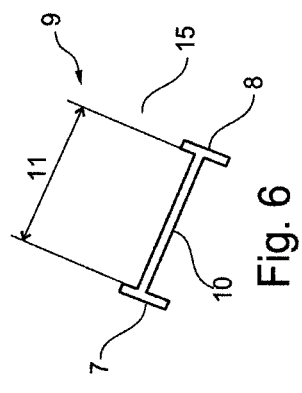
FIG. 6 shows a plan view of the wear indicator on the tread.

DESCRIPTION OF THE PREFERRED
EMBODIMENTS OF THE INVENTION

FIG. 1 shows a sipe 1 for forming a wear indicator. On its upper sipe side 5, the sipe 1 is incorporated, in a manner which is not shown, into a vulcanization mold which impresses the profile into the unvulcanized tread of the pneumatic vehicle tire. The sipe 1 has a triangular sipe part 6 which forms a straight incision in the tread of the tire, which incision serves as a wear indicator. Further sipe parts 2 and 3, which enter the tread in the radial direction, have the function of forming boundary incisions (7, 8) in the tread as shown in FIGS. 2 and 3. One side of the triangular sipe part 6 forms the sipe side 5, a further side runs along the sipe part 2, and the third part 4, which forms the hypotenuse of the triangle, connects the upper end of the sipe part 3 to the lower region of the sipe part 2. This connecting sipe part 4 can be provided with a rounded portion which assists the molding process after the vulcanization of the tire. The boundary incisions 7 and 8 preferably reach as far as the maximum profile depth which usually corresponds to the depth of the circumferential grooves which are formed in the tire profile; the incision 10 which is formed by the sipe part 6 reaches, for example, as far as the allowed minimum profile depth.

FIG. 2 shows the wear indicator 9, which is formed by the sipe 1 in the tread, in a view of the outside of the new tread, wherein 15 designates the tread surface. The wear indicator 9 therefore includes a left-hand side and a right-hand side boundary incision 7 and 8, corresponding to the sipe parts 2 and 3 from FIG. 1, and the incision 10 which runs between the boundary incisions 7 and 8 and of which the length 11, as is still to be described, is a measure of the wear and the existing profile depth. The boundary incisions 7 and 8 have, for example, a length of between 3 mm and 12 mm. Depending on the dimensions of the sipe 1, the length 11 of the incision 10 can exactly describe the profile depth of the tread. It is also possible for the length 12 to be used as a measure of the profile depth. In the case of the configuration of the sipe 1 which is shown in FIG. 1, the acute angle 18 is approximately 22.5°, and therefore the length 11 is to be multiplied by the factor of 2 in order to determine the remaining profile depth.

FIG. 3 shows the wear indicator 9 in a state in which a certain amount of tread wear has already taken place, and therefore the length 11 of the incision 10 is accordingly shorter. The mutual distance between the boundary incisions 7 and 8 has remained the same, and therefore it is easily possible to determine the level of the tread wear up until now by means of the mutual distance between the boundary incisions and the length 11. Since the incision 10 has been shortened by half in FIG. 3, there will be tread wear of approximately 10 mm given a profile depth of, for example, 20 mm.

FIG. 4 shows the state of the wear indicator 9 in which the minimum profile depth has already been reached. Therefore, only the boundary incisions 7 and 8 can be seen. This would therefore indicate to the vehicle user or the vehicle owner that the minimum profile depth has been reached and the pneumatic vehicle tire has to be replaced.

In a variant, which is not illustrated, of the sipe which is shown in FIG. 1, the sipe could reach as far as the maximum profile depth with its triangular sipe part. When the minimum profile depth is reached, a short piece of the incision 10 would then still be present, and therefore the length of the incision is a measure of the minimum profile depth being reached.

Figure 5:
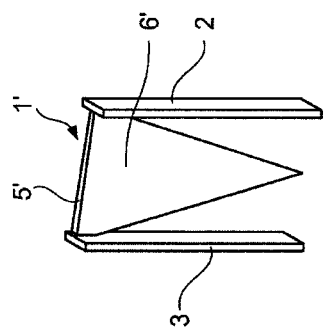
FIG. 5 shows a further embodiment of a sipe for forming a wear indicator.

FIG. 5 shows a further exemplary embodiment with a sipe 1' which is configured in the manner of a triangle, in this case in the form of an isosceles triangle by way of example. The hypotenuse of the triangle is situated on that sipe side 5' by way of which the sipe is bonded to a vulcanization mold. The sipe 1' further has two sipe parts (2, 3) which serve to form the boundary incisions 7 and 8, analogously to the first embodiment. In this embodiment, the triangular sipe part 6' and the sipe parts 2 and 3 reach as far as the intended and therefore also maximum profile depth.

FIG. 6 shows the wear indicator 9 which is formed by the sipe 1' in the tread of a new pneumatic vehicle tire and which has a left-hand side and a right-hand side boundary incision 7 and 8 and the straight incision 10 which runs between the incisions (7, 8). The length 11 of the incision 10 can describe the profile depth of the tread directly or using a recalculation factor.

Figure 7:
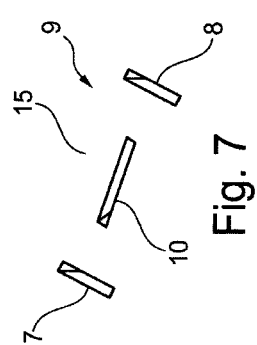
FIG. 7 shows a plan view of the wear indicator after a certain amount of tread wear.

FIG. 7 shows the wear indicator 9 which is formed by the sipe 1' in a state in which tread wear has already taken place. The length of the incision 10 has therefore correspondingly reduced; the incision 10 is at a respective distance from the boundary incisions 7 and 8. Depending on the dimensions of the sipe part 6', the length of the incision 10 can directly indicate the remaining profile depth. The tread wear which has already taken place can likewise be determined by the two boundary incisions 7 and 8 and the distances of the boundary incisions from the incision 10.

Figure 8:
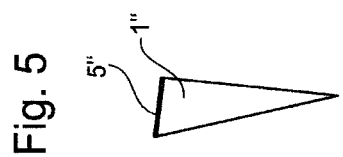
FIG. 8 shows a further embodiment of a sipe for molding a wear indicator in the tread.

FIG. 8 shows a further exemplary embodiment of a sipe 1'' which comprises only a triangular part and is anchored on its sipe side 5'' in the vulcanization mold in a manner which is known and not shown. No sipe parts for making boundary incisions are provided.

Figure 9:
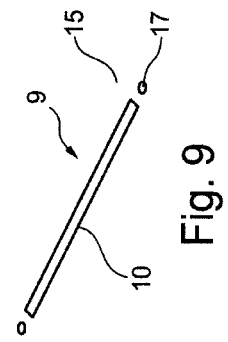
FIG. 9 shows a plan view of the wear indicator, which is produced using the sipe from FIG. 8, in a new tread.

FIG. 9 shows the wear indicator 9 which is formed by the sipe 1'' in the tread of a pneumatic vehicle tire in the case of a new tire. The wear indicator 9 has only one incision 10 which runs straight in the tread. In this exemplary embodiment, the length of the incision 10 therefore also changes as wear advances and is a measure of the wear state and, respectively, can, depending on the dimensions of the sipe 1'', directly describe the respective profile depth of the tread or is correspondingly correlated to the respective profile depth. Small holes 17, of which the diameter is between 0.5 mm and 2 mm for example, are formed in the tread at small, identical distances from the two ends of the incision 10 and in positions extrapolated from the incision 10. The holes 17 run in the tread in the radial direction as far as the intended maximum profile depth. Analogously to the boundary incisions of the previous variant embodiments, the mutual distance between the holes 17 together with the length of the incision 10 can therefore likewise be used to determine the wear which has already taken place. The two holes 17 can be produced in the tread by means of pins which are anchored in the vulcanization mold.

Figure 10:
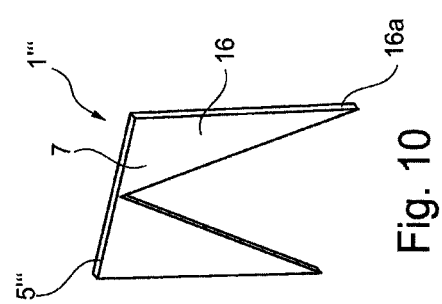
FIG. 10 shows a further embodiment of a sipe for producing a wear indicator in the tread of a tire.

FIG. 10 shows an exemplary embodiment of a sipe 1''' comprising two triangular sipe parts 16 of identical dimensions. As viewed from the side, the outer contour of the sipe 1''' substantially follows a W. The two sipe parts 16 are again right-angled triangles, of which the right angle is associated with the outside of the tread, the sipe side 5''' is that side by way of which the sipe 1''' is bound to the vulcanization mold, which is not illustrated, and which corresponds to the level of the tread surface in a new tire. The hypotenuses of the triangular sipe parts 16 together form an inverted V-shaped opening in the sipe 1'''; the outer sipe sides 16a run in the radial direction. Depending on the dimensions of the sipe parts 16, the apexes of the sipe parts can reach as far as the intended maximum profile depth or as far as the legally prescribed minimum profile depth. The apexes can furthermore be designed in a "truncated" manner. A design with rounded sipe sides is also possible. It is further possible to provide a distance between the two triangular sipe parts 16 on the sipe side 5'''. In a new tire, this produces an incision which is made up of two sections. In a further variant which is not shown, the two sipe parts 16 can be connected to one another in such a way that a continuous incision of constant length is maintained for the time being in the initial stage of wear of the tread, and two separate incisions in the tread can be identified only at a certain tread wear.

Figure 11:
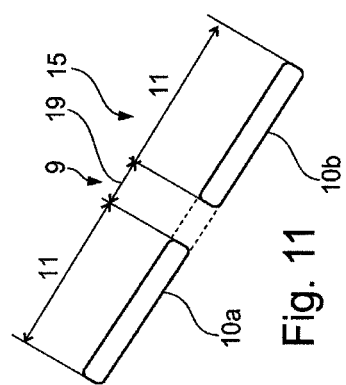
FIGS. 11 and 12 show plan views of a wear indicator which is produced using a sipe according to FIG. 10 in two different stages of wear; and, FIGS. 13 and 14 show views of the screen sides of a mobile telephone.

FIG. 11 shows the wear indicator 9, produced with the sipe 1''' according to FIG. 10, in a relatively new tread which has been only slightly driven on. The wear indicator 9 comprises two straight incisions 10a and 10b which run at a slight distance 19 from one another and are aligned with one another. The respective lengths 11 of the incisions 10a and 10b can now directly indicate the remaining profile depth in the tread or, depending on the dimensions of the sipe parts 16, can be proportional to the respective profile depth. The distance 19 between the two incisions 10a and 10b is likewise a measure of the remaining profile depth.

Figure 12:
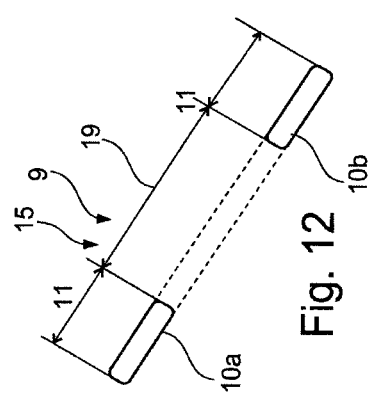

FIG. 12 shows the wear indicator 9, produced with the sipe 1''', in the case of a tire profile which has already been further driven on, wherein reference sign 15 again describes the tread surface. The length 11 of the incisions 10a and 10b has clearly reduced. The length 19 between the two incisions 10a and 10b has become larger and indicates the extent of wear and is therefore, like the lengths 11, a measure of the existing profile depth.

The incisions 10, 10a and 10b can have the width of 0.4 mm to approximately 1 mm which is usual for incisions in the tread.

According to the invention, the wear state of the tread profile which is provided with one or more of the described wear indicators is determined in a particularly convenient and accurate manner using a mobile telephone, in particular a smartphone, by means of a specific application program, an app. In this case, the application program per se is not the subject matter of this invention.

As is known, a smartphone is a mobile telephone which is not only optimized in respect of construction and operation for making telephone calls, but rather permits a wide range of applications. Smartphones have an operating system which allows the user to install programs or application software which are downloaded by means of a PC or are loaded and installed on the smartphone by means of corresponding software in an automatic or manual manner or else directly by means of the mobile radio network or the mobile Internet connection. Application programs (apps) are stored in an internal memory or an inserted memory card. A mobile telephone which is suitable within the scope of the invention further has an incorporated camera.

Figure 13:
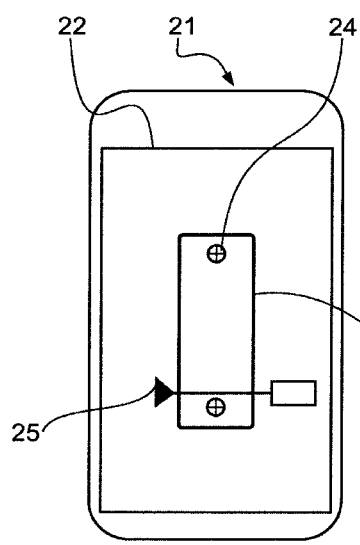
Figure 14:
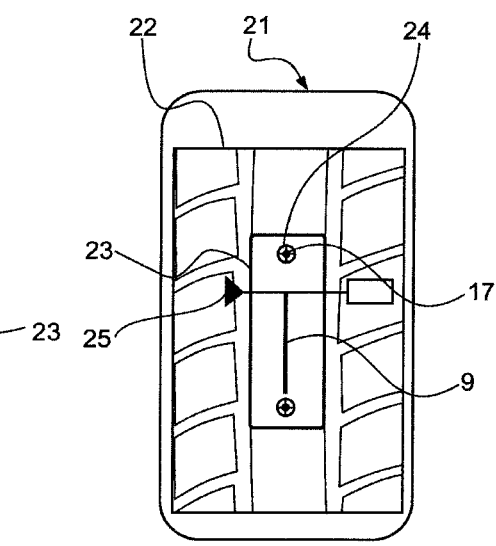

FIG. 13 and FIG. 14 show views of a smartphone 21, wherein the side having the screen 22 is illustrated. The smartphone 21 can be one of the customary smartphones which is commercially available and which allows application programs (apps) to be installed. The screen 22 can be one of the customary touchscreens.

The application program which is intended to determine the current profile depth of a pneumatic vehicle tire using a wear indicator 9 is started in the customary manner, for example by means of an icon. The camera function is preferably also activated when the application program is started and a positioning mask 23 is displayed on the screen 22. In order to determine the profile depth, the vehicle or the tire which is to be examined is intended to be positioned in such a way that the wear indicator 9 is visible and the smartphone 21 above the wear indicator 9 can be moved toward the wear indicator. In order to facilitate positioning of the tire, markings which are, for example, colored or conspicuous or clearly visible in some other way can be made on the tire in the outer shoulder regions, the markings being located to the side in relation to the position of the wear indicator.

The positioning mask 23 shows or comprises at least two markers 24, for example in the form of two circles, as is shown in FIG. 13, or in the form of a "+" or some other symbol. In the case of the wear indicators 9 being designed according to FIG. 9 with two holes 17 and a straight incision 10—as is also shown in FIG. 14—the markers 24 are preferably two small circles. The smartphone 21 is positioned above the tread, and therefore the camera records the wear indicator 9 which is visible on the screen 22. In the case of one possible design of the application program, provision is made for the smartphone 21 to be moved until the two markers 24, in this case the circles, are in line with the two holes 17. The application program can then automatically create a recording by means of the camera or the camera can be tripped by hand. In another variant, a photograph of the wear indicator is created and the markers are only then brought into line with the holes 17 of the recording, in particular by correspondingly increasing or reducing the size of the photograph by means of moving fingers over the screen 22 or touchscreen. FIG. 14 shows the recording on the screen 22 with positioned markers 24. The application program can be programmed in such a way that it directly calculates the profile depth from the length of the incision 10 and the stored incision dimensions. It is also possible for at least one measurement marking 25, for example a dash with an arrow symbol, to be displayed on the screen 22, the measurement marking being shifted to one end of the incision 10 in the recording. This process can likewise be performed automatically by the application program, or alternatively manually by moving the measurement marking 25 over the touchscreen. A plurality of markings 25 can also be displayed, so that, depending on the design of the incision/incisions, the end/ends of the incision/incisions can be recorded by in each case one measurement marking. As an alternative, a measurement marking 25 can be moved to various positions and the positions can be stored. The actual profile depth which correlates to the position/positions of the measurement marking/markings 25 is calculated by the application program and directly displayed on the screen 22. In addition or as an alternative, the profile depth existing until the minimum profile depth is reached can be displayed.

The measurement result, the profile depth, is stored together with the date of the recording in a memory which is present in the mobile telephone. Provision can be made to send the data to an external data memory or server by data transfer, for example by Internet or by means of a mobile radio network. The latter measure is advantageous and useful particularly when the application program is used in mobile telephones of users of vehicles of a fleet of vehicles in fleet management.

If the wear indicators 9 are designed as is illustrated in FIGS. 1 to 7, the markers 24 can preferably be designed as short dashes which are intended to be brought into line with the boundary incisions 7 and 8. In the case of the wear indicators 9 being designed according to FIGS. 10 to 12, the markers 24 can likewise be short dashes which are intended to be brought into line with the outer ends of the two incisions in each case. More than two markers 24 can also be provided, depending on the design of the wear indicator 9.

It goes without saying that the application program is programmed in such a way that the current profile depth or the still usable profile depth available until the minimum profile depth is reached is calculated depending on the dimensions of the incisions, the respective minimum profile depth or the maximum profile depth of the tire or tire type. The mutual distance between the holes 17, the boundary incisions (7, 8) and the like remains constant over the tread wear, and therefore the holes 17, the incisions (7, 8) and the like are reference marks for calculating the current profile depth, the calculation furthermore being performed on the basis of the stored actual dimensions of the at least one incision.

The application program can have further functions, in particular, provision can be made for vehicle-related data, such as the mileage, tire data, such as the tire position of the measured tire on the vehicle, its designation and the like, to be input and to be stored. This data can also be transmitted to an external location by data transfer.

The invention can be used particularly advantageously when a respective wear indicator is fitted on two opposite shoulder-side profile elements, for example shoulder blocks, in the tread of the tire, in order to allow comparison of wear on the inside with wear on the outside. Wear indicators of this kind are called Visual Alignment Indicators (VAI). The background is to ensure that incorrect chassis settings on the vehicle can be quickly identified. The use of indicators which can be measured using a smartphone, as described, means the measurements are more accurate and allows simple comparison. The application software can have a dedicated, selectable mode for measurements of this type and for evaluation of the measurements.

It is understood that the foregoing description is that of the preferred embodiments of the invention and that various changes and modifications may be made thereto without departing from the spirit and scope of the invention as defined in the appended claims.

LIST OF REFERENCE NUMERALS

1, 1', 1", 1''' . . . Sipe
2 . . . Sipe part
3 . . . Sipe part
4 . . . Sipe part
5, 5', 5", 5''' . . . Sipe side
6, 6' . . . Sipe part
7 . . . Boundary incision
8 . . . Boundary incision
9 . . . Wear indicator
10 . . . Incision
10a . . . Incision
10b . . . Incision
11 . . . Length
12 . . . Length
15 . . . Surface of the tread
16 . . . Sipe part
16a . . . Sipe side
17 . . . Hole
18 . . . Angle
19 . . . Distance
21 . . . Smartphone
22 . . . Screen
23 . . . Positioning mask
24 . . . Marker
25 . . . Measurement marking

What is claimed is:

1. A method for determining a profile depth of a tread of a pneumatic vehicle tire, wherein the tread has a wear indicator provided therein and defines a tread outer side; the pneumatic vehicle tire defining a radial direction, the wear indicator having at least one incision extending in the radial direction; the incision having a length visible on the tread outer side and the length being configured to become shorter in a defined manner as wear increases; the wear indicator further having at least two reference marks being at a mutual distance from each other; said mutual distance being configured to remain constant and visible throughout the wear of the tread; the method comprising the steps of:

generating a photo of the incision and the reference marks via an application program of a mobile phone having a camera and an image screen;

calculating a current profile depth from the mutual distance of the reference marks and the length of the incision via the application program;

displaying a positioning mask having at least two markers;

aligning the reference marks of the wear indicator with the markers of the positioning mask before or after generating the photo; and, displaying at least one of the current profile depth and a remaining profile depth until a minimal profile depth is reached on the image screen.

2. The method of claim 1, wherein the markers are one of circles, lines, + signs and other symbols.

3. The method of claim 1, wherein the incision has ends; and, the reference marks on the tread are holes formed in the tread disposed at a short distance from the ends of the incision.

4. The method of claim 1, wherein the incision has ends; and, the reference marks of the tread are short delimiting incisions in the tread and disposed at the ends of the incision.

5. The method of claim 1, wherein the incision has outer ends arranged in alignment with each other; and, the reference marks of the tread are the outer ends of the incision.

6. The method of claim 1 further comprising the step of:
displaying at least one measurement marking on the image screen, wherein the incision has an incision end and the measurement marking is positioned at the incision end of the photographed incision.

7. The method of claim 6, wherein the at least one measurement marking is configured as a line or an arrow and is manually or automatically brought into a measurement position.

8. The method of claim 1 further comprising the step of:
transmitting the calculated profile depth to an external location via a data transfer.

9. The method of claim 8, wherein the external location is an external server or data storage unit.

10. The method of claim 8, wherein the calculated profile depth is transmitted via the internet or the mobile phone network.

11. The method of claim 1, wherein the application program is configured to store additional data.

12. The method of claim 11, wherein the additional data includes at least one of the time, date, vehicle related data and tire related data.

13. The method of claim 1, wherein said mobile phone is a smart phone.

14. A method for determining a profile depth of a tread of a pneumatic vehicle tire via a computer program stored on a non-transitory computer readable storage unit of a mobile phone having a camera and a screen, the tread of the pneumatic vehicle tire having a wear indicator provided therein and defining a tread outer side; the pneumatic vehicle tire defining a radial direction, the wear indicator having at least one incision extending in the radial direction; the incision having a visible length configured to become shorter in a defined manner as wear increases; the wear indicator further having two reference marks having a mutual distance from each other configured to remain constant and visible throughout the wear of the tread; the method comprising the steps of:

providing on the screen a positioning mask having at least two markers to be aligned with the reference marks of the wear indicator;

generating an image of the incision with the markers aligned with the reference marks;

displaying a positioning mask having at least two markers;

aligning the reference marks of the wear indicator with the markers of the positioning mask before or after generating the image;

calculating a current profile depth from the length of the incision and incision characteristic data stored on the computer readable storage unit; and, displaying at least one of the current profile depth and a remaining profile depth until a minimal profile depth is reached on the screen.

15. The method of claim 14 further comprising the step of automatically or manually aligning the markers of the positioning mask with the reference marks of the tread.

16. The method of claim 14, wherein the markers are circles or lines.

17. The method of claim 14 further comprising the step of storing at least one of date, time, vehicle data and tire data.

18. The method of claim 14 further comprising transmitting the calculated current profile depth to an external location.

19. The method of claim 14 further comprising transmitting the calculated current profile depth to an external server via the internet or a mobile phone network.

20. The method of claim 7, wherein the camera is activated manually or automatically in the measurement position of the markers.

* * * * *